(12) United States Patent
Filsfils et al.

(10) Patent No.: US 9,634,924 B2
(45) Date of Patent: Apr. 25, 2017

(54) SERVER-LAYER SHARED LINK RISK GROUP ANALYSIS TO IDENTIFY POTENTIAL CLIENT-LAYER NETWORK CONNECTIVITY LOSS

(71) Applicants: Clarence Filsfils, Brussels (BE); Ornan Alexander Gerstel, Herzelia (IL); Jean-Philippe Vasseur, Saint Martin d'Uriage (FR)

(72) Inventors: Clarence Filsfils, Brussels (BE); Ornan Alexander Gerstel, Herzelia (IL); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 13/792,130

(22) Filed: Mar. 10, 2013

(65) Prior Publication Data

US 2014/0258486 A1    Sep. 11, 2014

(51) Int. Cl.
| G06F 15/173 | (2006.01) |
| H04L 12/707 | (2013.01) |
| H04L 12/709 | (2013.01) |

(52) U.S. Cl.
CPC ............ H04L 45/22 (2013.01); H04L 45/245 (2013.01); Y02B 60/33 (2013.01)

(58) Field of Classification Search
CPC . H04L 12/2678; H04L 41/0654; H04L 45/22; H04L 45/128; H04L 45/1283; H04L 45/1287
See application file for complete search history.

(56) References Cited

U.S. PATENT DOCUMENTS

| 2002/0191545 A1* | 12/2002 | Pieda et al. ................... 370/238 |
| 2006/0140190 A1* | 6/2006 | Lee ............................. 370/395.3 |
| 2007/0011284 A1* | 1/2007 | Le Roux et al. ............. 709/223 |
| 2008/0131123 A1* | 6/2008 | Park et al. ....................... 398/66 |

(Continued)

OTHER PUBLICATIONS

Lang et al., RFC 4872, May 2007, Netowrk Workign Group, p. 17-20.*

(Continued)

*Primary Examiner* — Krisna Lim
(74) *Attorney, Agent, or Firm* — The Law Office of Kirk D. Williams

(57) ABSTRACT

In one embodiment, a particular device within a client-layer network maintains client-layer topology information including server-layer Shared Risk Link Group (SRLG) information of server-layer devices and links in a server-layer network associated with client-layer links and client-layer nodes in the client-layer network. A determination is made to discover if there is an alternative client-layer path to an established client-layer path between a first packet switching device and a second packet switching device if all server-layer resources of any particular server-layer SRLG of a plurality of total server-layer SRLGs associated with the established client-layer path become unavailable. In one embodiment, the plurality of total server-layer SRLGs includes: an SRLG of a same optical node, an SRLG of a same optical fiber, an SRLG of co-located plurality of optical nodes, and/or an SRLG of co-located plurality of optical fibers.

15 Claims, 3 Drawing Sheets

(56) References Cited

U.S. PATENT DOCUMENTS

| | | | |
|---|---|---|---|
| 2008/0170857 A1* | 7/2008 | Bardalai | 398/59 |
| 2009/0103442 A1* | 4/2009 | Douville | H04L 45/04 370/248 |
| 2012/0076046 A1* | 3/2012 | Lin | H04L 12/40013 370/254 |
| 2012/0221624 A1 | 8/2012 | Gerstel et al. | |
| 2014/0307538 A1* | 10/2014 | Iovanna | H04L 45/64 370/218 |

OTHER PUBLICATIONS

Vasseur et al., "Path Computation Element (PCE) Communication Protocol (PCEP)," RFC 5440, The Internet Society, Reston, VA, USA, Mar. 2009 (eighty-seven pages).

Le Roux et al., "Encoding of Objective Functions in the Path Computation Element Communication Protocol (PCEP)," FC 5541, The Internet Society, Reston, VA, USA, Jun. 2009 (twenty-three pages).

Oki et al., "A Disjoint Path Selection Scheme With Shared Risk Link Groups in GMPLS Networks," IEEE Communications Letters, vol. 6, No. 9, Sep. 2002, IEEE, New York, New York (three pages).

Xu et al., "SRLG-Diverse Routing of Multiple Circuits in a Heterogeneous Optical Transport Network," Design of Reliable Communication Networks (DRCN), 2011 8th International Workshop, Oct. 10-12, 2011, IEEE, New York, New York (eight pages).

Duroyon et al., "G.LSP Service Model framework in an Optical G-MPLS network," <draft-duroyon-te-ip-optical-01.txt>, The Internet Society, Reston, VA, USA, Nov. 2000 (eighteen pages).

Papadimitriou and Jones, "Enhanced LSP Services in Optical Networks," draft-papadimitriou-enhanced-lsps-04.txt, The Internet Society, Reston, VA, USA, Jul. 2001 (thirty-one pages).

Braden et al., "Resource ReSerVation Protocol (RSVP)—Version 1 Functional Specification," RFC 2205, Sep. 1997, The Internet Society, Reston, VA, USA (112 pages).

* cited by examiner

SERVER-LAYER SHARED LINK RISK GROUP ANALYSIS TO IDENTIFY POTENTIAL CLIENT-LAYER NETWORK CONNECTIVITY LOSS

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques may be employed in a network to communicate packets in a network when the topology of the network changes, such as when a path over which certain packets are forwarded becomes unavailable.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
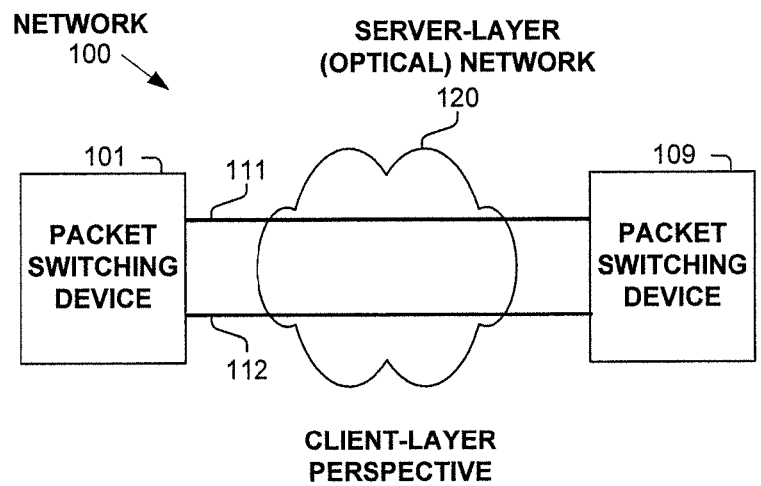
FIGS. 1A-B illustrate a network operating according to one embodiment.

Disclosed are, inter alia, methods, apparatus, computer-storage media, mechanisms, and means associated with server-layer Shared Risk Link Group (SRLG) analysis to identify potential client-layer network connectivity loss. One embodiment includes a method, comprising: maintaining, by a particular device within a client-layer network, client-layer topology information including server-layer Shared Risk Link Group (SRLG) information of server-layer devices and links in a server-layer network associated with client-layer links and client-layer nodes in the client-layer network; and determining to discover if there is an alternative client-layer path to an established client-layer path between a first packet switching device and a second packet switching device if all server-layer resources of any particular server-layer SRLG of a plurality of total server-layer SRLGs associated with the established client-layer path become unavailable.

2. Description

Disclosed are, inter alia, methods, apparatus, computer-storage media, mechanisms, and means associated with server-layer Shared Risk Link Group (SRLG) analysis to identify potential client-layer network connectivity loss. As used herein, a server-layer SRLG refers to a set of one or more things in the server network that will fail together, with these things being links, devices, nodes, etc. For example, an SRLG may be a device, such as a switch, repeater, regenerator, link, etc. Two links that traverse a same single point of failure (e.g., are wavelengths within a same fiber, are in different fibers that are co-located such as within a same conduit, or run under a same building such as they would both fail upon building collapse).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with server-layer Shared Risk Link Group (SRLG) analysis to identify potential client-layer network connectivity loss. One embodiment includes a method, comprising: maintaining, by a particular device within a client-layer network, client-layer topology information including server-layer Shared Risk Link Group (SRLG) information of server-layer devices and links in a server-layer network associated with client-layer links and client-layer nodes in the client-layer network; and determining to discover if there is an alternative client-layer path to an established client-layer path between a first packet switching device and a second packet switching device if all server-layer resources of any particular server-layer SRLG of a plurality of total server-layer SRLGs associated with the established client-layer path become unavailable.

In one embodiment, said determining to discover if there is an alternative client-layer path includes: for the established client-layer path, determining for each particular one or more particular server-layer SRLGs of a plurality of total server-layer SRLGs associated with the established client-layer path: whether or not a second client-layer path exists between the first packet switching device and the second packet switching device using client-layer links and client-layer nodes each of which are not associated with said particular one or more particular server-layer SRLGs.

In one embodiment, said one or more particular server-layer SRLGs consists of one server-layer SRLG. In one embodiment, said one or more particular server-layer SRLGs includes at least two server-layer SRLGs. In one embodiment, the particular device is the first packet switching device, and the server-layer network is an optical network. In one embodiment, said determining if a second client-layer path exists is performed by the first packet switching device. In one embodiment, said one or more particular server-layer SRLGs consists of one server-layer SRLG.

In one embodiment, said determining to discover if there is an alternative client-layer path determines that there is not an alternative client-layer path. In one embodiment, said determining to discover if there is an alternative client-layer path determines that there is an alternative client-layer path. In one embodiment, the server-layer network is an optical network.

One embodiment includes: receiving, by the particular device, at least a portion of said server-layer SRLG information of server-layer devices and links in the server-layer network associated with client-layer links and client-layer nodes in the client-layer network. One embodiment includes: receiving in one or more routing protocol or link state protocol messages, by the particular device, at least a portion of said server-layer SRLG information of server-layer devices and links in the server-layer network associated with client-layer links and client-layer nodes in the client-layer network; and wherein the particular device is the first packet switching device. In one embodiment, the plurality of total server-layer SRLGs includes: an SRLG of a same optical node, an SRLG of a same optical fiber, an SRLG of co-located plurality of optical nodes, and an SRLG of co-located plurality of optical fibers. One embodiment includes: logging, or generating an alarm, warning or informational message of the result of said determining to discover if there is an alternative client-layer path.

One embodiment includes a method, comprising: maintaining, by a first packet switching device within a client-layer network, client-layer topology information including server-layer Shared Risk Link Group (SRLG) information of server-layer devices and links in a server-layer network associated with client-layer links and client-layer nodes in the client-layer network; and determining to discover if an alternative client-layer path to an established client-layer path between the first packet switching device and a second packet switching device exists if all server-layer resources of any particular server-layer SRLG of a plurality of total server-layer SRLGs associated with the established client-layer path become unavailable.

In one embodiment, said determining to discover if an alternative client-layer path to the established client-layer includes determining for each particular server-layer SRLG of a plurality of total server-layer SRLGs associated with the established client-layer path that a client-layer path exists between the first packet switching device and the second packet switching device using client-layer links and client-layer nodes each of which are not associated with said particular server-layer SRLG. In one embodiment, the server-layer network is an optical network. In one embodiment, the plurality of total server-layer SRLGs includes: an SRLG of a same optical node, and an SRLG of a same optical fiber. In one embodiment, the plurality of total server-layer SRLGs includes: an SRLG of co-located plurality of optical nodes, or an SRLG of co-located plurality of optical fibers.

One embodiment includes a packet switching device, comprising: one or more processing elements; memory; a plurality of interfaces configured to send and receive packets; and one or more packet switching mechanisms configured to switch packets among said interfaces. In one embodiment, said one or more processing elements are configured to perform operations, including: maintaining client-layer topology information including associated server-layer Shared Risk Link Group (SRLG) information of server-layer devices and links in a server-layer network associated with client-layer links and client-layer nodes in the client-layer network; exchanging, with other packet switching devices in a packet switching client network, information from said maintained client-layer topology information; communicating with a second packet switching device over an established client-layer path using server-layer resources; and determining to discover if there is an alternative client-layer path to the second packet switching device if all server-layer resources of any particular server-layer SRLG of a plurality of total server-layer SRLGs associated with the established client-layer path become unavailable.

In one embodiment, a node N1 (e.g., Internet Protocol (IP) router) with an IP link L1 to a node N2 (e.g., IP router) learns the SRLG information of that link L1 from the underlying server layer via Generalized Multi-Protocol Label Switching (GMPLS) User-Network Interface (UNI) extension between N1 and an optical node O1 connected to N1. N1 advertises the link L1 (and its discovered SRLG) into an Intermediate System-to-Intermediate System (IS-IS)/ Open Shortest Path First (OSPF) label switched (LS) database and/or into a Border Gateway Protocol (BGP) label switched (LS) database. In this manner, any node in the IP topology connected to ISIS/OSPF LSDB or BGP-LS database knows: the full IP topology, and for any link, its SRLG(s).

Having acquired this information, any node (e.g., a packet switching device, network manager, path computation engine), has the information to determine if there is an alternative client-layer path to an established client-layer path between a first packet switching device and a second packet switching device if all server-layer resources of any particular server-layer SRLG of a plurality of total server-layer SRLGs associated with the established client-layer path become unavailable. In one embodiment, this determination is made periodically. In one embodiment, this determination is made in response to a change in the network (e.g., as reflected in a change in one of these databases). In one embodiment, this determination is made in response to a change in the network for only the affected portion of the topology (e.g., changes in SLRG(s), link(s) and/or node(s)).

Expressly turning to the figures, FIG. 1A illustrates a network 100 including client layer devices (e.g., packet switching devices 101 and 109) and a server-layer network (e.g., optical or other network providing communications services to the client-layer devices). FIG. 1A is shown from the client-layer perspective, that is, packet switching devices 101 and 109 view that there are two independent client-layer paths 111 and 112 between them (provided by server-network 120), so if one of these two client-layer paths (111, 112) fails the other client-layer path (111, 112) can be used to communicate traffic.

Figure 1B:
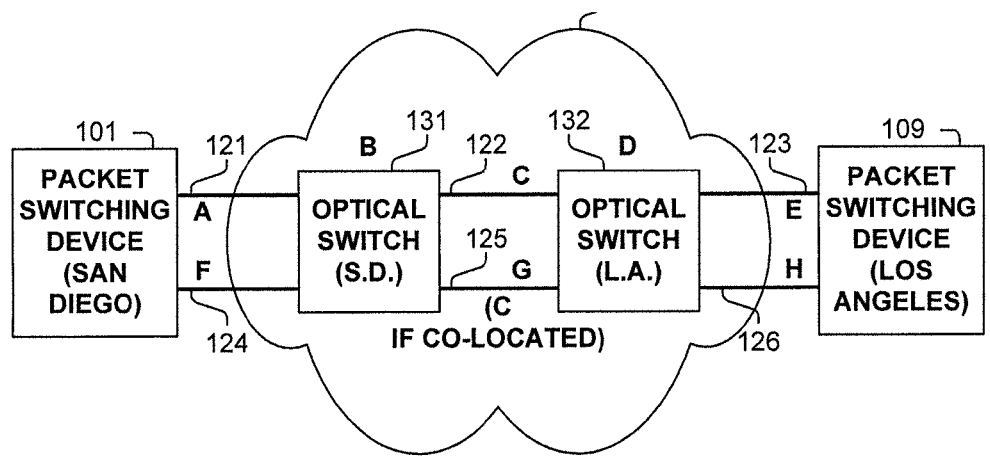

However, FIG. 1B shows network 100 of FIG. 1A with more details about server-layer network 120 of one embodiment. In one embodiment, packet switching devices 101 and 109 are located in different locations so they are not part of a same SRLG (e.g., packet switching device 101 is located in San Diego, and packet switching device 109 is located in Los Angeles).

As shown, packet switching device 101 is connected to optical switch 131 via two fibers 121 and 122, which are diversely run so they are in different SRLGs. Fiber 121 is part of SRLG-A, and fiber 122 is part of SRLG-F. Optical switch 131 is part of SRLG-B. Optical switch 131 is coupled to optical switch 132 via two fibers 122 and 125, which are diversely run so they are part of different SRLGs. Fiber 122 is part of SRLG-C, and fiber 125 is part of SRLG-G. Optical switch 132 is part of SRLG-D. In one embodiment, fibers 122 and 125 are not diversely run (e.g., they are wavelength in a same fiber, they run through a same conduit, under a same building) and therefore would be both part of SRLG-C. Finally, optical switch 132 is connected to packet switching device 109 via two fibers 123 and 126, which are diversely run so they are in different SRLGs. Fiber 123 is part of SRLG-E, and fiber 126 is part of SRLG-H.

Refer to FIGS. 1A and 1B, client path 111 is subject to server-layer SRLGs: A, B, C, D and E; and client path 112 is subject to server-layer SRLGs: F, B, G, D and H.

In one embodiment, client path 111 is established, over which packet switching devices 101 and 109 communicate. A determination operation is performed by a network management system, packet switching device 101 or another device to determine whether or not there is currently another client-layer path between them if any one or more of the SRLGs associated with client path 111 fails. In one embodiment, this determination is made as if only a single one of these SRLGs fails. In one embodiment, this determination includes if multiple of these SRLGs are in failure at a same time. In one embodiment, certain SRLGs are excluded from this determination. For example in one embodiment, optical switches 131 and 132 are excluded from such consideration as their failure is considered minimal or for other reason(s).

One embodiment compares the SRLG's of all other paths between packet switching devices 101 and 109 to see if there are any overlapping SRLGs. In one embodiment, there is an alternative path if one of these other paths does not have a common SRLG (e.g., one that is subject to consideration).

In one embodiment shown in FIGS. 1A and 1B and excluding from consideration optical switches 131 and 132, client path 111 is subject to server-layer SRLGs: A, C, and E; and client path 112 is subject to server-layer SRLGs: F, G, and H. Therefore, there is an alternative path if any of the server-layer SRLGs associated with client path 111 fails.

In one embodiment shown in FIGS. 1A and 1B and excluding from consideration optical switches 131 and 132 and considering links 122 and 125 being co-located, client path 111 is subject to server-layer SRLGs: A, C, and E; and client path 112 is subject to server-layer SRLGs: F, C, and H. Therefore, there is not an alternative path if any of the SRLGs associated with client path 111 fails (as both paths 111 and 112 are subject to the same SRLG-C).

Typically, packet switching devices 101 and 109 exchange client-layer topology information (e.g., link state, connectivity) via one or more routing or other protocols (e.g., using one or more Interior or Border Gateway Protocols or label distribution protocol(s)). Associated with this topology information is server-layer SRLG associated with the links and devices. Packet switching devices 101 and 109 maintain such information in a data structure, such as, but not limited to, in a routing information base.

In one embodiment, an alternative client-layer path between packet switching devices 101 and 109 is determined by progressively sequencing through each particular server-layer SRLG associated with an established client-layer path, and determining if there is another path between them when excluding from consideration links and devices that belong to that particular server-layer SRLG. If there is such a path for each of the server-layer SRLGs associated with the established client-layer path, then there is an alternative path for a failure of any one of these SRLGs. If there is not such a path for each of the server-layer SRLGs associated with the established client-layer path, then a backup path for the established client-layer path is also subject to a failure of at least one of the SRLGs of the established path.

In one embodiment, this analysis is performed by excluding two or more server-layer SRLGs at the same time, and checking all combinations (which includes considering a failure of all SRLGs of the established client-layer path at the same time).

Figure 2A:
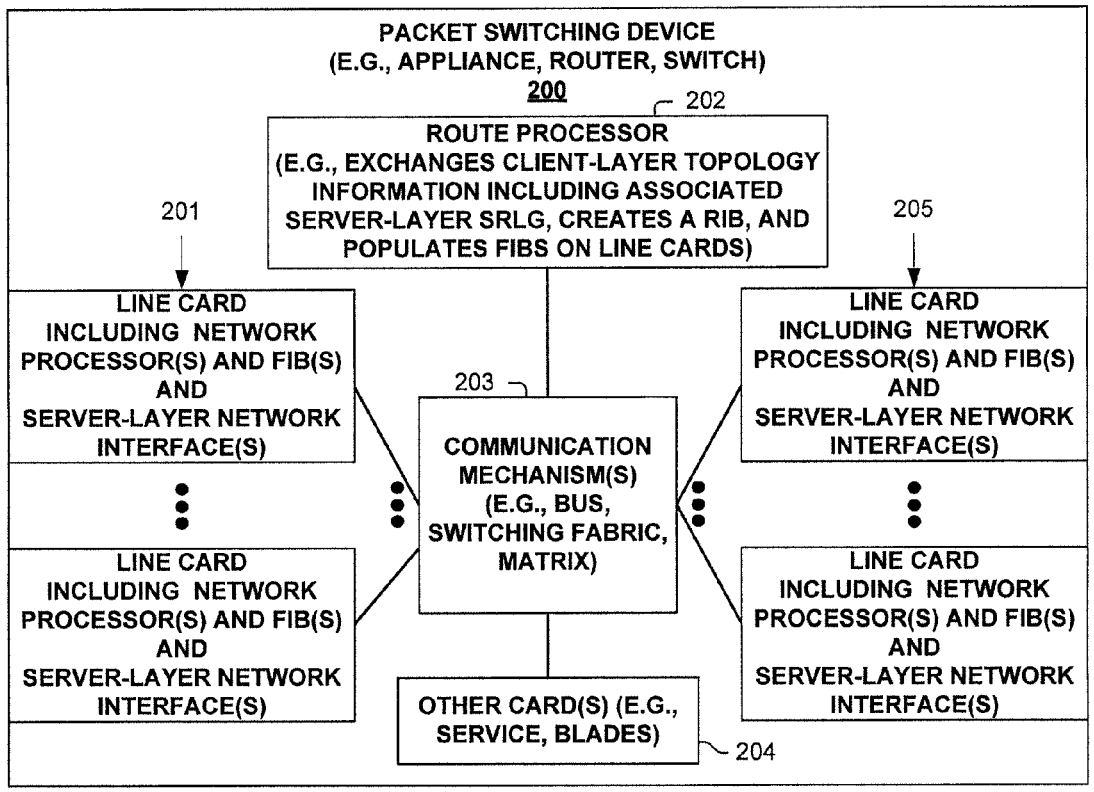
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., coupled to a server-layer network such as an optical network), and with one or more processing elements that are used in one embodiment associated with server-layer Shared Risk Link Group (SRLG) analysis to identify potential client-layer network connectivity loss. Packet switching device 200 also has a control plane with one or more processing elements 202 for managing the control plane and/or control plane processing of packets associated with server-layer SRLG analysis to identify potential client-layer network connectivity loss. Packet switching device 200 also includes other cards 204 (e.g., service cards, blades) which include processing elements that are used in one embodiment to process packets associated with server-layer SRLG analysis to identify potential client-layer network connectivity loss, and some communication mechanism 203 (e.g., bus, switching fabric, matrix) for allowing its different entities 201, 202, 204 and 205 to communicate.

Figure 2B:
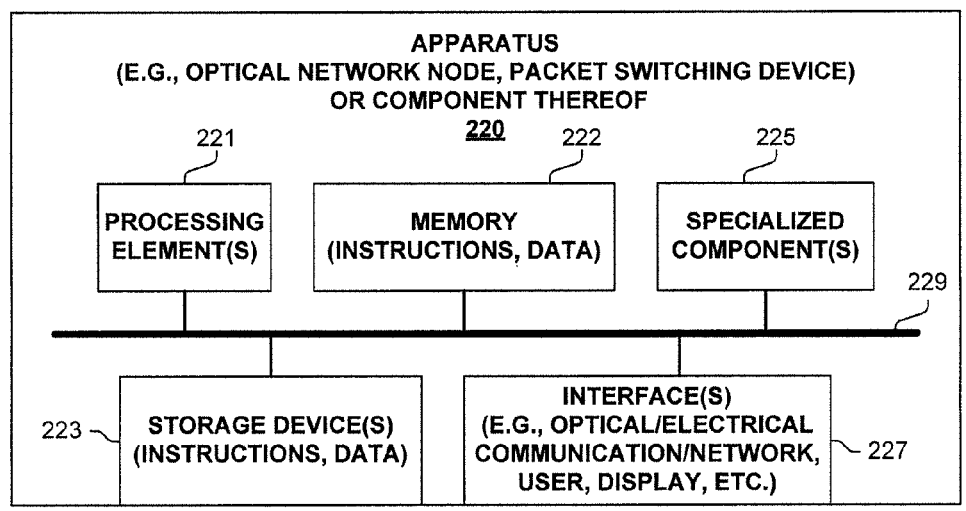
FIG. 2B illustrates an apparatus according to one embodiment.

FIG. 2B is a block diagram of an apparatus 220 used in one embodiment associated with server-layer Shared Risk Link Group (SRLG) analysis to identify potential client-layer network connectivity loss. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
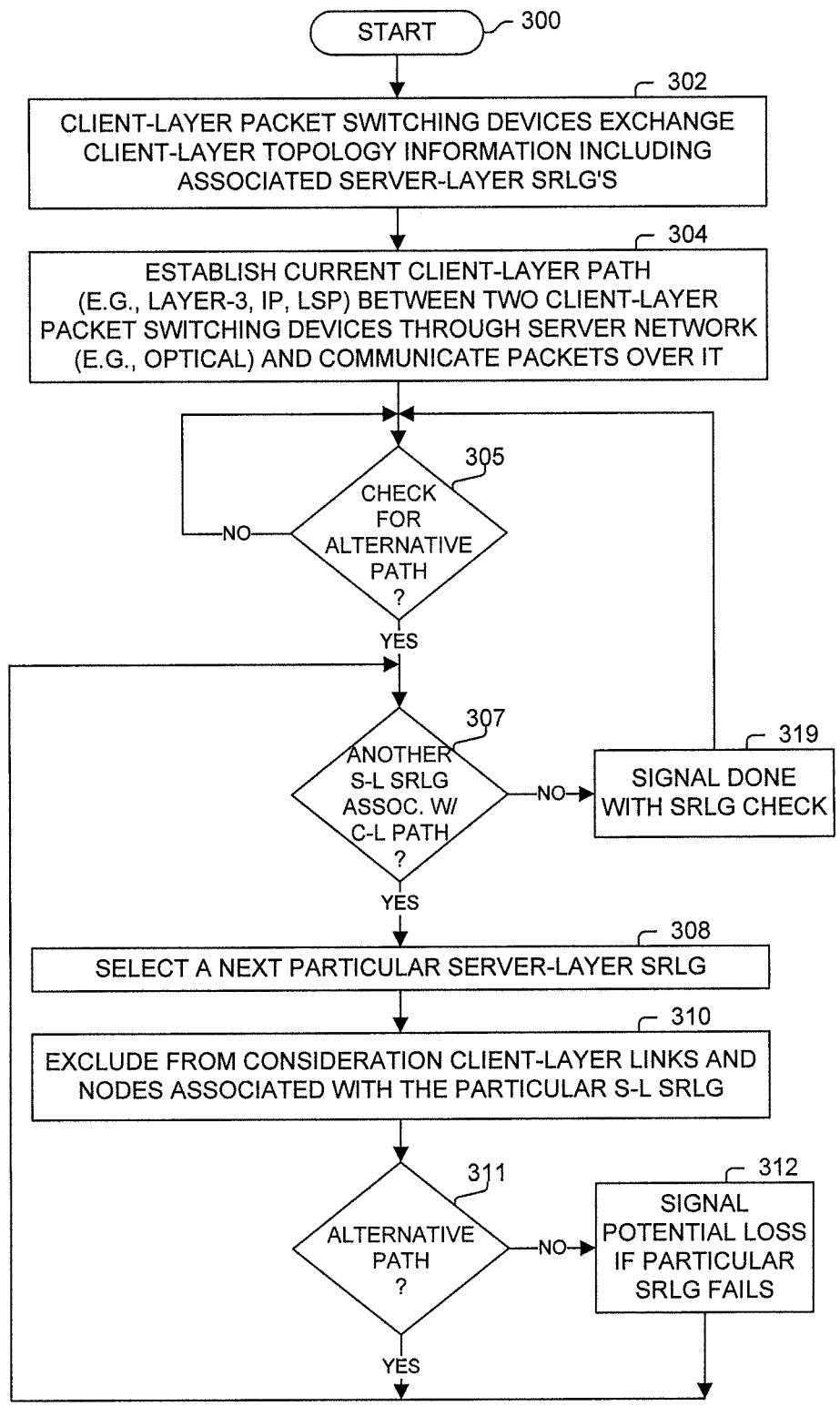
FIG. 3 illustrates a process according to one embodiment.

FIG. 3 illustrates a process performed in one embodiment (e.g., by a network management device, a packet switching device such one that terminates the client-layer path established in process block 304). Processing begins with process block 300. In process block 302, client-layer packet switching devices exchange client-layer topology information including associations with server-layer SRLGs. In process block 304, a current client-layer path (e.g., Layer-3, Internet Protocol, label switched path) between two client packet switching devices through a server network (e.g., optical), and these devices communicate over the established client-layer path.

Processing block 305 is performed to determine whether it is time to check for an alternative packet (e.g., periodically, time or day/week/month, in response to some trigger such as an event, priority traffic, operator intervention, etc.). When it is time to check, processing proceeds to the processing loop of process blocks 307-319 to sequence through each particular SRLG of the SRLG(s) associated with the established client-layer path to determine whether there is an alternative path that is not part of the particular SRLG.

Continuing with process block 307, while there is at least one more server-layer SRLGs to check, processing proceeds to process block 308 to select a particular SRLG of the remaining SRLGs to check. In one embodiment, this particular SRLG refers to a single server-layer SRLG associated with established client-layer path. In one embodiment, this particular SRLG refers to multiple, possibly all, server-layer SRLGs associated with established client-layer path. In process block 310, a determination is made to find another client-layer path between the two packet switching devices while excluding client-layer links and nodes associated with the particular server-layer SRLG currently being evaluated (as selected in process block 308). As determined in process block 311, if such an alternative path was found, processing returns to process block 307. As determined in process block 311, if such an alternative path was not found, then in process block 312, the potential loss of connectivity is signaled (e.g., logged, error, alarm, warning and/or information message is generated) as no alternative client-layer path would be available between the two packet switching devices upon failure of the particular server-layer SRLG. Processing returns to process block 307.

As determined in process block 307, where all SRLGs have been evaluated (or in one embodiment in response to determining in process block 311 that an alternative path was not available), the completion of the evaluation of the server-layer SRLG analysis to identify potential client-layer network connectivity loss is signaled (e.g., logged, informational message generated) in process block 319. Processing returns to process block 305.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

advertising, among a plurality of packet switching devices within a client-layer packet switching network using a routing protocol, client-layer topology information including corresponding server-layer Shared Risk Link Group (SRLG) information of server-layer devices and links in a server-layer network associated with client-layer links and client-layer nodes in the client-layer packet switching network, wherein said server-layer SRLG information said advertised is acquired by the plurality of packet switching devices from the server-layer network;

maintaining in each of the plurality of packet switching devices said client-layer topology information of the client-layer packet switching network and associated said server-layer SRLG information such that each of the plurality of packet switching devices has information locally to determine if there is an alternative client-layer path to an established client-layer path between two particular packet switching devices of the plurality of packet switching devices if all server-layer resources of any particular server-layer SRLG of a plurality of total server-layer SRLGs associated with the established client-layer path become unavailable;

establishing the established client-layer path between said two particular packet switching devices and communicating a plurality of packets over the established client-layer path; and subsequent to said establishing the established client-layer path, determining the alternative client-layer path between said two particular packet switching devices by one of the plurality of packet switching devices based on said maintained said client-layer topology information of the client-layer packet switching network and associated said server-layer SRLG information;

wherein the server-layer network and the client-layer packet switching network are two different networks, with the server-layer network providing connectivity between devices of the client-layer packet switching network; wherein the established client-layer path and the alternative client-layer path are direct connections from the perspective of the client-layer packet switching network and connections via a plurality of particular server-layer devices or links from the perspective of the server-layer network; and wherein said maintained server-layer SRLG information includes SRLG information of each of the plurality of particular server-layer devices or links.

2. The method of claim 1, wherein said determining the alternative client-layer path between said two particular packet switching devices includes: for the established client-layer path, determining for each particular one or more particular server-layer SRLGs of a plurality of total server-layer SRLGs associated with the established client-layer path: whether or not a second client-layer path exists between said two particular packet switching device using client-layer links and client-layer nodes each of which are not associated with said particular one or more particular server-layer SRLGs.

3. The method of claim 1, wherein said one or more particular server-layer SRLGs consists of one server-layer SRLG.

4. The method of claim 1, wherein said one or more particular server-layer SRLGs includes at least two server-layer SRLGs.

5. The method of claim 1, wherein the server-layer network is an optical network.

6. The method of claim 5, wherein said one or more particular server-layer SRLGs consists of one server-layer SRLG.

7. The method of claim 5, wherein the plurality of total server-layer SRLGs includes: an SRLG of a same optical node, an SRLG of a same optical fiber, an SRLG of co-located plurality of optical nodes, and an SRLG of co-located plurality of optical fibers.

8. A packet switching device, comprising:
one or more processing elements;
memory;
a plurality of interfaces configured to send and receive packets; and
one or more packet switching mechanisms configured to switch packets among said interfaces;
wherein the packet switching devices is configured to perform operations, including:

exchanging, with a plurality of other packet switching devices in a client-layer packet switching network using a routing protocol, client-layer topology information including corresponding server-layer Shared Risk Link Group (SRLG) information of server-layer devices and links in a server-layer network associated with client-layer links and client-layer nodes in the client-layer packet switching network;

populating a local routing information base (RIB) with said client-layer topology information of the client-layer packet switching network and associated said server-layer SRLG information such that the packet switching device has information locally to determine if there is an alternative client-layer path to an established client-layer path between the packet switching device and a second packet switching device of the plurality of other packet switching devices if all server-layer resources of any particular server-layer SRLG of a plurality of total server-layer SRLGs associated with the established client-layer path become unavailable;

communicating with the second packet switching device over an established client-layer path using server-layer resources; and determining if there is an alternative client-layer path to the second packet switching device if all server-layer resources of any particular server-layer SRLG of a plurality of total server-layer SRLGs associated with the established client-layer path become unavailable;

wherein the server-layer network and the client-layer packet switching network are two different networks, with the server-layer network providing connectivity between devices of the client-layer packet switching network; wherein the established client-layer path and the alternative client-layer path are direct connections from the perspective of the client-layer packet switching network and connections via a plurality of particular server-layer devices or links from the perspective of the server-layer network; and wherein said maintained server-layer SRLG information includes SRLG information of each of the plurality of particular server-layer devices or links.

9. The packet switching device of claim 8, wherein said determining if there is an alternative client-layer path to the second packet switching device includes: for the established client-layer path, determining for each particular one or more particular server-layer SRLGs of a plurality of total server-layer SRLGs associated with the established client-layer path: whether or not a second client-layer path exists between said two particular packet switching device using client-layer links and client-layer nodes each of which are not associated with said particular one or more particular server-layer SRLGs.

10. The packet switching device of claim 8, wherein said one or more particular server-layer SRLGs consists of one server-layer SRLG.

11. The packet switching device of claim 8, wherein said one or more particular server-layer SRLGs includes at least two server-layer SRLGs.

12. The packet switching device of claim 8, wherein the server-layer network is an optical network.

13. The packet switching device of claim 12, wherein said one or more particular server-layer SRLGs consists of one server-layer SRLG.

14. The packet switching device of claim 12, wherein the plurality of total server-layer SRLGs includes: an SRLG of a same optical node, an SRLG of a same optical fiber, an SRLG of co-located plurality of optical nodes, and an SRLG of co-located plurality of optical fibers.

15. A method, comprising:

exchanging, by a packet switching device with a plurality of other packet switching devices in a client-layer packet switching network using a routing protocol, client-layer topology information including corresponding server-layer Shared Risk Link Group (SRLG) information of server-layer devices and links in a server-layer network associated with client-layer links and client-layer nodes in the client-layer packet switching network;

populating a local routing information base (RIB) in the packet switching device with said client-layer topology information of the client-layer packet switching network and associated said server-layer SRLG information such that the packet switching device has information locally to determine if there is an alternative client-layer path to an established client-layer path between the packet switching device and a second packet switching device of the plurality of other packet switching devices if all server-layer resources of any particular server-layer SRLG of a plurality of total server-layer SRLGs associated with the established client-layer path become unavailable;

communicating by the packet switching device with the second packet switching device over an established client-layer path using server-layer resources; and determining by the packet switching device if there is an alternative client-layer path to the second packet switching device if all server-layer resources of any particular server-layer SRLG of a plurality of total server-layer SRLGs associated with the established client-layer path become unavailable;

wherein the server-layer network and the client-layer packet switching network are two different networks, with the server-layer network providing connectivity between devices of the client-layer packet switching network; wherein the established client-layer path and the alternative client-layer path are direct connections from the perspective of the client-layer packet switching network and connections via a plurality of particular server-layer devices or links from the perspective of the server-layer network; and wherein said maintained server-layer SRLG information includes SRLG information of each of the plurality of particular server-layer devices or links.

\* \* \* \* \*